United States Patent
Ma et al.

(10) Patent No.: US 10,929,015 B2
(45) Date of Patent: Feb. 23, 2021

(54) TOUCH DETECTION METHOD AND APPARATUS, TOUCH DEVICE, COMPUTER DEVICE AND READABLE MEDIUM

(71) Applicant: BOE TECHNOLOGY GROUP CO., LTD., Beijing (CN)

(72) Inventors: Xitong Ma, Beijing (CN); Naifu Wu, Beijing (CN); Lihua Geng, Beijing (CN); Xianzhen Li, Beijing (CN); Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/523,522

(22) Filed: Jul. 26, 2019

(65) Prior Publication Data

US 2020/0241745 A1 Jul. 30, 2020

(30) Foreign Application Priority Data

Jan. 29, 2019 (CN) .......................... 201910085450.8

(51) Int. Cl.
*G06F 3/0488* (2013.01)
*G06F 3/041* (2006.01)

(52) U.S. Cl.
CPC ...... *G06F 3/04886* (2013.01); *G06F 3/04164* (2019.05); *G06F 3/04186* (2019.05)

(58) Field of Classification Search
CPC ...... H04N 9/3147; H04N 9/12; G09F 9/3026; G09F 9/3023; G06F 3/04886; G06F 2203/04803; G06F 3/1446; G06F 3/04883; G06F 3/0414; G06F 3/04186; G09G 3/04–3/19; G09G 2300/23; G09G 2300/026; G09G 2360/04; G09G 2300/023; G09G 2356/00; G02F 1/13336; Y10S 345/903; F01L 27/3293; H01L 27/3267; A63F 2300/301

See application file for complete search history.

(56) References Cited

U.S. PATENT DOCUMENTS

| 2009/0309853 A1* | 12/2009 | Hildebrandt | G06F 3/0421 345/175 |
| 2016/0364196 A1* | 12/2016 | Sun | G09G 5/003 |
| 2017/0262246 A1* | 9/2017 | Guo | G06F 3/1431 |

* cited by examiner

*Primary Examiner* — Temesghen Ghebretinsae
*Assistant Examiner* — Karin Kiyabu
(74) *Attorney, Agent, or Firm* — Nath, Goldberg & Meyer; Joshua B. Goldberg (57) ABSTRACT

The present disclosure provides a touch detection method for a touch splicing screen, including: obtaining the following parameters: sizes of each of the display units in a row direction and in a column direction, a width of each of the first splicing intervals, a width of each of the second splicing intervals, and physical position information of a touch point; determining whether the touch point is within an area of the splicing intervals according to the parameters; and calculating, when the touch point is beyond the area of the splicing intervals, a position of a pixel unit corresponding to the touch point according to a resolution of the touch splicing screen, a row number and a column number in an arrangement of the display units, and the parameters.

15 Claims, 3 Drawing Sheets

TOUCH DETECTION METHOD AND APPARATUS, TOUCH DEVICE, COMPUTER DEVICE AND READABLE MEDIUM

CROSS-REFERENCE TO RELATED APPLICATION

This application claims priority from Chinese patent application No. 201910085450.8 filed with the China National Intellectual Property Administration on Jan. 29, 2019, the disclosure of which is incorporated herein by reference in its entirety.

TECHNICAL FIELD

The present disclosure relates to the field of touch technology, and particularly relates to a touch detection method and apparatus for a touch splicing screen, a touch device, a computer device, and a computer readable medium.

BACKGROUND

In a splicing display system, a plurality of display units are arranged to form a splicing screen. For a splicing screen with a touch function, splicing intervals during splicing of the plurality of display units are inevitable, resulting in deviations in a physical position and a pixel position of a touch point (i.e., a position of a pixel unit in the splicing screen corresponding to the touch point).

SUMMARY

The present disclosure has been accomplished in order to at least partially solve the problems in related art. The present disclosure provides a touch detection method, a touch detection apparatus, a touch device, a computer device and a computer readable medium for a touch splicing screen that can improve touch detection precision of the touch splicing screen.

According to an aspect of the present disclosure, there is provided a touch detection method for a touch splicing screen including a plurality of display units arranged in an array, in which splicing intervals are present between any two adjacent display units, the splicing intervals including first splicing intervals between any two adjacent display units in the same row and second splicing intervals between any two adjacent display units in the same column, the touch detection method including:

obtaining sizes of each of the display units in a row direction and in a column direction, a width of each of the first splicing intervals, and a width of each of the second splicing intervals;

obtaining physical position information of a touch point in the touch splicing screen; and determining whether the touch point is within an area of the splicing intervals according to the physical position information of the touch point in the touch splicing screen, the sizes of each of the display units in the row direction and in the column direction, the width of each of the first splicing intervals, and the width of each of the second splicing intervals, and calculating, when the touch point is beyond the area of the splicing intervals, position information of a pixel unit in the touch splicing screen corresponding to the touch point according to a resolution of the touch splicing screen, the physical position information of the touch point in the touch splicing screen, a row number and a column number in an arrangement of the display units, the width of each of the first splicing intervals, the width of each of the second splicing intervals, and the sizes of each of the display units in the row direction and in the column direction.

In some embodiments, each of the display units has the same size a in the row direction; each of the display units has the same size b in the column direction; each of the first splicing intervals has the same width m; each of the second splicing intervals has the same width n, and the step of determining whether the touch point is within the area of the splicing intervals according to the physical position information of the touch point in the touch splicing screen, the sizes of each of the display units in the row direction and in the column direction, the width of each of the first splicing intervals, and the width of each of the second splicing intervals includes:

determining whether the physical position information of the touch point satisfies the following conditions, and determining that the touch point is within the area of the splicing intervals when the physical position information of the touch point satisfies at least one of condition I and condition II; and determining that the touch point is beyond the area of the splicing intervals when the physical position information of the touch point satisfies condition III.

$a \leq |x| - C*(a+m) \leq a+m;$  condition I:

$b \leq |y| - D*(b+n) \leq b+n;$  condition II:

$|x| - C*(a+m) < a$ and $b < |y| - C*(b+n);$  condition III:

where x is the position information of the touch point in the row direction; y is the position information of the touch point in the column direction; $C=INT(|x|/(a+m))$; $D=INT(|y|/(b+n))$; INT is rounded down.

In some embodiments, the touch splicing screen has a resolution of P*Q; the display units in the touch splicing screen are arranged in a matrix of p columns and q rows; the position information of the pixel unit in the touch splicing screen corresponding to the touch point includes: a row number s and a column number r in the touch splicing screen of the pixel unit in the touch splicing screen corresponding to the touch point, which are calculated according to the following formulas:

$$r = \frac{P*(|x|-C*m)}{a*p+m*(p-1)}$$

$$s = \frac{Q*(|y|-D*n)}{b*q+n*(q-1)}$$

where x is an abscissa of the touch point in a preset coordinate system, and y is an ordinate of the touch point in the preset coordinate system, an origin of the preset coordinate system is a vertex of the touch splicing screen closest to the pixel unit of the first row and the first column, the x-direction is the row direction, and the y-direction is the column direction.

In some embodiments, before the step of obtaining the physical position information of the touch point in the touch splicing screen, the touch detection method further includes:

establishing a two-dimensional rectangular coordinate system, wherein an origin of the two-dimensional rectangular coordinate system is one of the vertices of the touch splicing screen, the x-direction is the row direction, and the y-direction is the column direction;

the position information of the touch point in the row direction includes an abscissa of the touch point in the two-dimensional rectangular coordinate system, and the position information of the touch point in the column direction includes an ordinate of the touch point in the two-dimensional rectangular coordinate system.

In some embodiments, the physical position information of the touch point in the touch splicing screen is obtained by means of infrared detection.

In some embodiments, the width of each of the first splicing intervals and the width of each of the second splicing intervals are both obtained by means of infrared detection.

According to another aspect of the present disclosure, there is provided a touch detection apparatus for a touch splicing screen including a plurality of display units arranged in an array, in which splicing intervals are present between any two adjacent display units, the splicing intervals including first splicing intervals between any two adjacent display units in the same row and second splicing intervals between any two adjacent display units in the same column, the touch detection apparatus including:

a first sensor configured to obtain sizes of each of the display units in a row direction and in a column direction, a width of each of the first splicing intervals, and a width of each of the second splicing intervals;

a second sensor configured to obtain physical position information of a touch point in the touch splicing screen:

a determining part configured to determine whether the touch point is within an area of the splicing intervals according to the physical position information of the touch point in the touch splicing screen, the sizes of each of the display units in the row direction and in the column direction, the width of each of the first splicing intervals, and the width of each of the second splicing intervals, and a calculating part configured to calculate, when the determining part determines that the touch point is beyond the area of the splicing intervals, position information of a pixel unit in the touch splicing screen corresponding to the touch point according to a resolution of the touch splicing screen, the physical position information of the touch point in the touch splicing screen, a row number and a column number in an arrangement of the display units, the width of each of the first splicing intervals, the width of each of the second splicing intervals, and the sizes of each of the display units in the row direction and in the column direction.

In some embodiments, each of the display units has the same size a in the row direction; each of the display units has the same size b in the column direction; each of the first splicing intervals has the same width m; each of the second splicing intervals has the same width n, and the determining part includes an analyzing component and a determining component, the analyzing component is configured to determine whether the physical position information of the touch point satisfies the following conditions:

$a \leqslant |x|-C*(a+m) \leqslant a+m;$              condition I:

$b \leqslant |y|-D*(b+n) \leqslant b+n;$              condition II:

$|x|-C*(a+m)<a$ and $b<|y|-C*(b+n);$        condition III:

where x is the position information of the touch point in the row direction; y is the position information of the touch point in the column direction; $C=INT(|x|/(a+m))$; $D=INT(|y|/(b+n))$; INT is rounded down;

the determining component is configured to determine that the touch point is within the area of the splicing intervals when the physical position information of the touch point satisfies at least one of condition I and condition II; and determine that the touch point is beyond the area of the splicing intervals when the physical position information of the touch point satisfies condition III.

In some embodiments, the touch splicing screen has a resolution of P*Q; the display units in the touch splicing screen are arranged in a matrix of p columns and q rows; the position information of the pixel unit in the touch splicing screen corresponding to the touch point includes: a row number s and a column number r in the touch splicing screen of the pixel unit in the touch splicing screen corresponding to the touch point, the calculating part is configured to calculate the row number s and the column number r according to the following formulas:

$$r = \frac{P*(|x|-C*m)}{a*p+m*(p-1)}$$

$$s = \frac{Q*(|y|-D*n)}{b*q+n*(q-1)}$$

where x is an abscissa of the touch point in a preset coordinate system, and y is an ordinate of the touch point in the preset coordinate system: an origin of the preset coordinate system is a vertex of the touch splicing screen closest to the pixel unit of the first row and the first column, the x-direction is the row direction, and the y-direction is the column direction.

In some embodiments, the touch detection apparatus further includes:

a coordinate system establishing part configured to establish a two-dimensional rectangular coordinate system, wherein an origin of the two-dimensional rectangular coordinate system is one of the vertices of the touch splicing screen, the x-direction is the row direction, and the y-direction is the column direction:

the position information of the touch point in the row direction includes an abscissa of the touch point in the two-dimensional rectangular coordinate system, and the position information of the touch point in the column direction includes an ordinate of the touch point in the two-dimensional rectangular coordinate system.

In some embodiments, the second sensor includes an infrared detection wire frame that surrounds the touch splicing screen.

In some embodiments, the first sensor includes an infrared ranging sensor disposed between each two adjacent display units.

According to still another aspect of the present disclosure, there is provided a touch device, including: a touch splicing screen and a touch detection apparatus for the touch splicing screen, wherein the touch detection apparatus is the touch detection apparatus described above.

According to yet another aspect of the present disclosure, there is provided a computer device including a memory storing a computer program thereon and a processor, wherein the computer program is executed by the processor to implement the touch detection method as described above.

According to still another aspect of the present disclosure, there is provided a computer readable medium storing a computer program thereon, wherein the program is executed by the processor to implement the touch detection method as described above.

BRIEF DESCRIPTION OF DRAWINGS

Accompanying drawings are provided for further understanding of this disclosure and constitute a part of the specification. Hereinafter, these drawings are intended to explain the disclosure together with the following specific embodiments, but should not be considered as a limitation of the disclosure, in which.

DETAILED DESCRIPTION

Hereinafter, specific embodiments of the present disclosure will be described in detail in conjunction with the accompanying drawings. It should be understood that the specific embodiments as set forth herein are merely for the purpose of illustration and explanation of the disclosure and should not be constructed as a limitation thereof.

In a splicing display system with a touch function, an infrared detection frame is disposed around the splicing screen. During a touch operation, the infrared detection frame is used for detecting a touch position, and physical position of the touch point in the splicing screen is used as a position of a touched pixel unit in the splicing screen. However, when splicing units of the splicing screen are spliced, splicing intervals may inevitably occur, which may cause inconsistence between the physical position of the touch point and the position of the touched pixel unit, thereby reducing the touch precision. For example, coordinates of the physical position of the touch point in the splicing screen are (x0, y0), and since no image is displayed in the splicing intervals of the splicing screen, the pixel unit determined from the coordinates (x0, y0) does not necessarily directly correspond to the touch point in an image displayed on the splicing screen.

Figure 1:
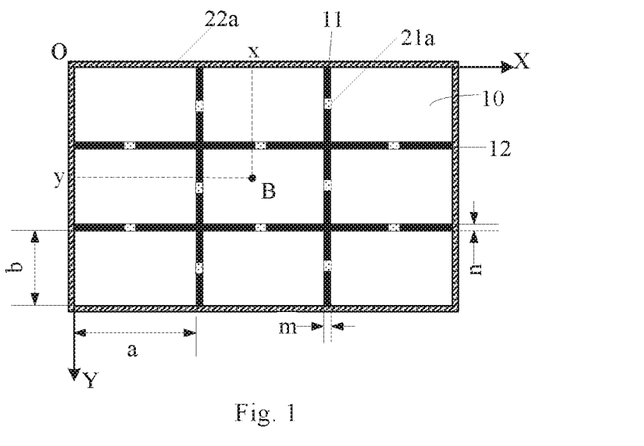
FIG. 1 is a schematic structural view of a touch splicing screen according to an exemplary embodiment of the disclosure.
Figure 2:
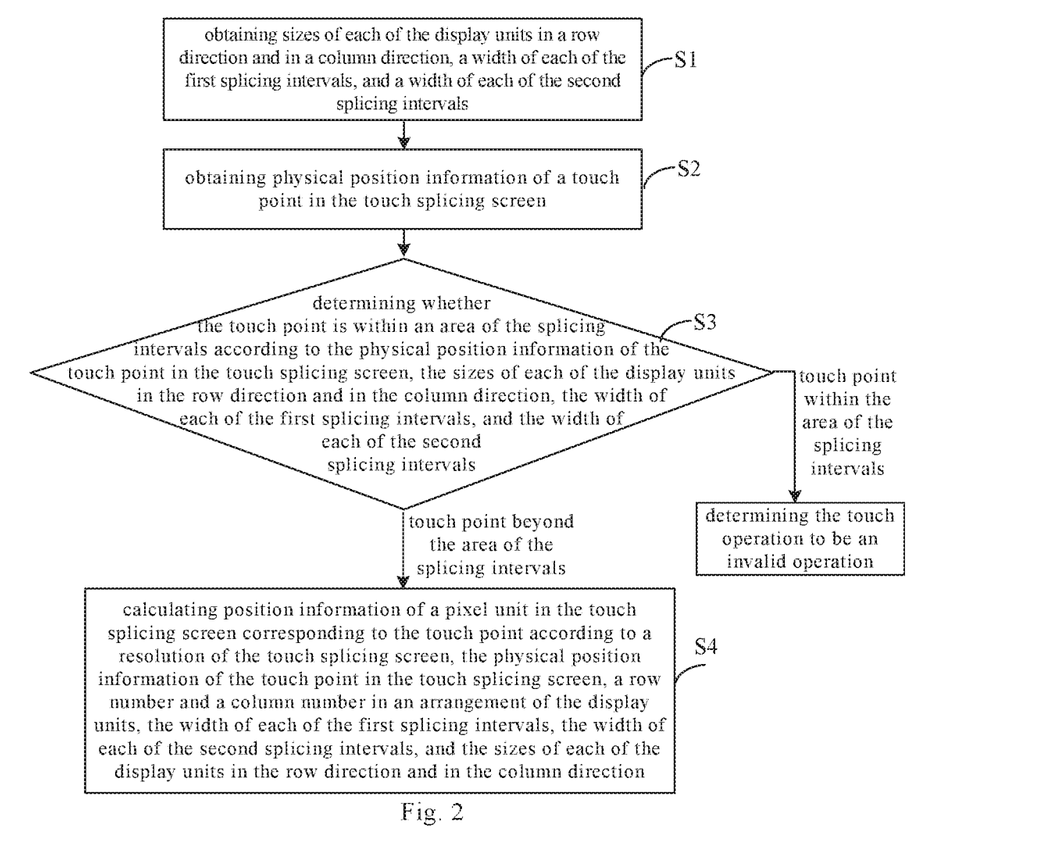
FIG. 2 is a flowchart of a touch detection method according to an exemplary embodiment of the disclosure.

In order to improve the touch precision of the touch splicing screen, according to an aspect of the present disclosure, there is provided a touch detection method for a touch splicing screen. FIG. 1 is a schematic structural view of a touch splicing screen according to an exemplary embodiment of the disclosure, and FIG. 2 is a flowchart of a touch detection method according to an exemplary embodiment of the disclosure. As shown in FIG. 1, the touch splicing screen includes a plurality of display units 10 arranged in an array, in which splicing intervals are present between any two adjacent display units 10. The splicing intervals includes first splicing intervals 11 between any two adjacent display units 10 in the same row and second splicing intervals 12 between any two adjacent display units 10 in the same column.

As shown in FIG. 2, the touch detection method includes:

At step S1, sizes of each of the display units 10 in a row direction and in a column direction, a width of each of the first splicing intervals 11, and a width of each of the second splicing intervals 12 are obtained.

At step S2, physical position information of the touch point in the touch splicing screen is obtained. For example, the physical position information may include relative position information of the touch point relative to a certain vertex of the touch splicing screen.

At step S3, it is determined whether the touch point is within an area of the splicing intervals according to the physical position information of the touch point in the touch splicing screen, the sizes of each of the display units 10 in the row direction and in the column direction, the width of each of the first splicing intervals 11, and the width of each of the second splicing intervals 12. When the touch point is within the area of the splicing intervals, it is determined that no effective pixel unit corresponds to the touch point, that is, the touch operation is determined to be an invalid operation; otherwise, step S4 is performed.

At step S4, position information of a pixel unit in the touch splicing screen corresponding to the touch point is calculated according to a resolution of the touch splicing screen, the physical position information of the touch point in the touch splicing screen, a row number and a column number in an arrangement of the display units 10, the width of each of the first splicing intervals 11, the width of each of the second splicing intervals 12, and the sizes of each of the display units 10 in the row direction and in the column direction.

After detecting the physical position of the touch point, the touch detection method provided by the exemplary embodiment of the present disclosure does not directly use the physical position of the touch point as the position of the pixel unit corresponding to the touch point. Instead, the position information of the pixel unit in the touch splicing screen corresponding to the touch point is determined from the physical position of the touch point, the sizes of the display units 10, the widths of the splicing intervals, the resolution of the touch splicing screen and the like, thereby avoiding an influence of the splicing intervals on the touch precision.

Figure 3:
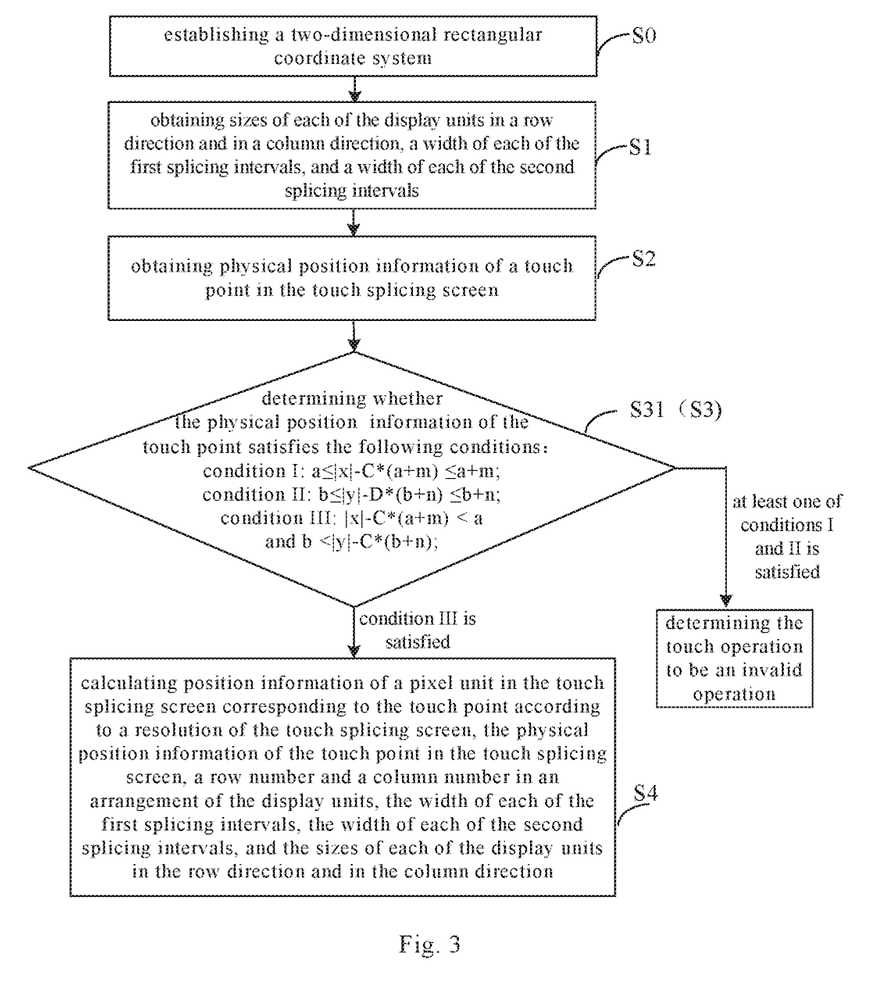
FIG. 3 is another flowchart of a touch detection method according to an exemplary embodiment of the disclosure.

FIG. 3 is another flowchart of a touch detection method according to an exemplary embodiment of the disclosure. The touch detection method of the present disclosure will now be explained in detail with reference to FIGS. 1 and 3. The touch detection method includes:

At step S0, a two-dimensional rectangular coordinate system is established.

In an exemplary embodiment of the present disclosure, an origin of the two-dimensional rectangular coordinate system is one of the vertices of the splicing screen, the x-direction is the row direction, and the y-direction is the column direction.

At step S1, sizes of each of the display units 10 in a row direction and in a column direction, a width of each of the first splicing intervals 11, and a width of each of the second splicing intervals 12 are obtained.

In an exemplary embodiment of the present disclosure, each of the display units 10 has the same size in the row direction; each of the display units 10 has the same size in the column direction; each of the first splicing intervals 11 has the same width; and each of the second splicing intervals 12 has the same width, so as to facilitate later formula calculations. It should be understood that, in the present disclosure, since the sizes of each of the display units 10 in the row direction and in the column direction, as well as the widths of each of the first splicing intervals 11 and the second splicing intervals 12 are separately measured by respective sensors, the display units 10 may have different sizes from each other in the row direction; the display units 10 may have different sizes from each other in the column direction; the first splicing intervals 11 may have different widths from each other; and the second splicing intervals 12 may have different widths from each other.

In an exemplary embodiment of the present disclosure, the width of each of the first splicing intervals 11 and the width of each of the second splicing intervals 12 are both obtained by means of infrared detection. Specifically, the widths may be obtained by an infrared ranging sensor 21a disposed between each two adjacent display units 10.

At step S2, physical position information of the touch point in the touch splicing screen is obtained.

In an exemplary embodiment of the present disclosure, the physical position information of the touch point in the touch splicing screen includes: position information of the touch point in the row direction and in the column direction in the touch splicing screen. The position information of the touch point in the row direction is specifically the abscissa of the touch point in the two-dimensional rectangular coordinate system, and the position information of the touch point in the column direction is specifically the ordinate of the touch point in the two-dimensional rectangular coordinate system.

In an exemplary embodiment of the present disclosure, the physical position of the touch point in the touch splicing screen is obtained by means of infrared detection, which can reduce the cost of the touch detection. Specifically, as shown in FIG. 1, an infrared detection wire frame 22a is disposed around the touch splicing screen. Among four edges of the infrared detection wire frame 22a, two adjacent edges are infrared emitter edges, while the other two are infrared receiver edges. The infrared emitter edges emit infrared rays at various positions. When no touch occurs in the touch splicing screen, infrared rays are received at various positions of the two infrared receiver edges; and when a touch occurs in the touch splicing screen, no infrared ray is received at a position of the two infrared receiver edges corresponding to the touch point. Therefore, the abscissa of the touch point is determined according to a position of the infrared receiver edges extending in the row direction without receiving the infrared rays, and the ordinate of the touch point is determined according to a position of the infrared receiver edges extending in the column direction without receiving the infrared rays. FIG. 1 schematically shows that when a coordinate system is established taking a vertex in an upper left corner of the touch splicing screen as an origin O, the row direction as the x-direction, and the column direction as the y-direction, the physical position information of a touch point B includes: the abscissa x and the ordinate y of the touch point B.

It should be noted that the order of the steps S0 to S2 is not limited to the above as long as the step S0 is before the step S2.

At step S3, it is determined whether the touch point is within an area of the splicing intervals according to the physical position information of the touch point in the touch splicing screen, the sizes of each of the display units 10 in the row direction and in the column direction, the width of each of the first splicing intervals, and the width of each of the second splicing intervals; and when the touch point is beyond the area of the splicing intervals, the step S4 is performed.

Specifically, the step S3 includes:

At step S31, it is determined whether the physical position information of the touch point satisfies the following conditions, and the touch point is determined to be within the area of the splicing intervals when the physical position information of the touch point satisfies at least one of condition I and condition 11, and it is thus determined that no effective pixel unit corresponds to the touch point in the touch splicing screen, that is, the touch operation is an invalid operation; and the touch point is determined to be beyond the area of the splicing intervals when the physical position information of the touch point satisfies condition III, and thus the step S4 is performed.

$$a \leq |x| - C^*(a+m) \leq a+m; \qquad \text{condition I:}$$

$$b \leq |y| - D^*(b+n) \leq b+n; \qquad \text{condition II:}$$

$$|x| - C^*(a+m) < a \text{ and } b < |y| - C^*(b+n), \qquad \text{condition III:}$$

where x is the position information of the touch point in the row direction; y is the position information of the touch point in the column direction; a is a size of each of the display units 10 in the row direction; b is a size of each of the display units 10 in the column direction; m is a width of each of the first splicing intervals; n is a width of each of the second splicing intervals; $C=INT(|x|/(a+m))$; $D=INT(|y|/(b+n))$; INT is rounded down.

It should be understood that when a position signal of the touch point satisfies the above condition I, the touch point is within the first splicing intervals; and when the position signal of the touch point satisfies the above condition II, the touch point is within the second splicing intervals.

At step S4, position information of a pixel unit in the touch splicing screen corresponding to the touch point is calculated according to a resolution of the touch splicing screen, the physical position information of the touch point in the touch splicing screen, a row number and a column number in an arrangement of the display units 10, the width of each of the first splicing intervals 11, the width of each of the second splicing intervals 12, and the sizes of each of the display units 10 in the row direction and in the column direction.

In an exemplary embodiment of the present disclosure, the touch splicing screen has a resolution of P*Q and a splicing pattern of p*q (i.e., the display units 10 in the touch splicing screen are arranged in a matrix of p columns and q rows). For example, each of the display units 10 has a physical resolution of 1920*1080, then P=p*1920; Q=q*1080; and a physical size of a display image is A*B, where:

$$A=a^*p+m^*(p-1), B=b^*q+n^*(q-1).$$

In the step S4, the position information of the pixel unit in the touch splicing screen corresponding to the touch point includes: a row number s and a column number r of the pixel unit in the touch splicing screen corresponding to the touch point, which are calculated according to the following formulas:

$$r = \frac{P*(|x| - C*m)}{a*p + m*(p-1)}$$

$$s = \frac{Q*(|y| - D*n)}{b*q + n*(q-1)}$$

where, referring to FIG. 1, x is an abscissa of the touch point in a preset coordinate system, and y is an ordinate of the touch point in the preset coordinate system; an origin of the preset coordinate system is a vertex of the touch splicing screen closest to the pixel unit of the first row and the first column, the x-direction is the row direction, and the y-direction is the column direction. In other words, the row number s means that taking the origin of the preset coordinate system as a reference, the pixel unit corresponding to the touch point is in the $s^{th}$ row in the touch splicing screen;

and the column number r means that the pixel unit corresponding to the touch point is in the $r^{th}$ column in the touch splicing screen.

For example, taking the vertex in the upper left corner of the touch splicing screen in FIG. 1 as an origin, a positive direction of the x-axis is a horizontal rightward direction, and a positive direction of the y-axis is a vertical downward direction. At this time, the row number s and the column number r respectively represent: the pixel unit corresponding to the touch point is in the $s^{th}$ row from the top and the $r^{th}$ column from the left in the touch splicing screen. On the other hand, taking the vertex in the lower left corner of the touch splicing screen in FIG. 1 as an origin, a positive direction of the x-axis is a horizontal rightward direction, and a positive direction of the y-axis is a vertical upward direction. Then the row number s and the column number r respectively represent: the pixel unit corresponding to the touch point is in the $s^{th}$ row from the bottom and the $r^{th}$ column from the left in the touch splicing screen. In an exemplary embodiment of the present disclosure, the preset coordinate system is the two-dimensional rectangular coordinate system established in the above step S0.

Figure 4:
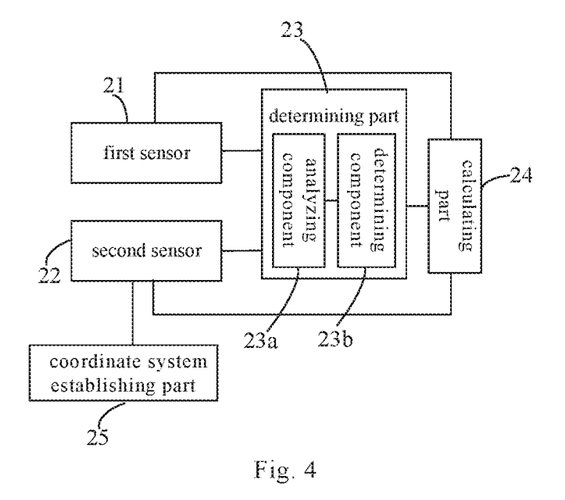
FIG. 4 is a schematic structural view of a touch detection apparatus for a touch splicing screen according to an exemplary embodiment of the disclosure.

Further, after determining the position information of the pixel unit corresponding to the touch point, a specific touch operation may be determined according to the position information of the pixel unit corresponding to the touch point, thereby controlling the display of the touch splicing screen. According to an aspect of the present disclosure, there is provided a touch detection apparatus for a touch splicing screen. FIG. 4 is a schematic structural view of a touch detection apparatus for a touch splicing screen according to an exemplary embodiment of the disclosure. As described above and as shown in FIG. 1, the touch splicing screen includes a plurality of display units 10 arranged in an array, in which splicing intervals are present between any two adjacent display units 10. The splicing intervals includes first splicing intervals 11 between any two adjacent display units 10 in the same row and second splicing intervals 12 between any two adjacent display units 10 in the same column. As shown in FIG. 4, the touch detection apparatus includes: a first sensor 21, a second sensor 22, a determining part 23, and a calculating part 24.

In an exemplary embodiment of the present disclosure, the first sensor 21 is configured to obtain sizes of each of the display units 10 in a row direction and in a column direction, a width of each of the first splicing intervals 11, and a width of each of the second splicing intervals 12.

In an exemplary embodiment of the present disclosure, the first sensor 21 includes an infrared ranging sensor 21a (shown in FIG. 1) disposed between each two adjacent display units 10.

The second sensor 22 is configured to obtain physical position information of a touch point in the touch splicing screen. In an exemplary embodiment of the present disclosure, the physical position information of the touch point in the touch splicing screen includes: position information of the touch point in the row direction and in the column direction in the touch splicing screen.

In an exemplary embodiment of the present disclosure, the second sensor 22 includes an infrared detection wire frame 22a that surrounds the touch splicing screen.

The determining part 23 is configured to determine whether the touch point is within an area of the splicing intervals according to the physical position information of the touch point in the touch splicing screen, the sizes of each of the display units 10 in the row direction and in the column direction, the width of each of the first splicing intervals 11, and the width of each of the second splicing intervals 12.

In an exemplary embodiment of the present disclosure, each of the display units 10 has the same size in the row direction; each of the display units 10 has the same size in the column direction; each of the first splicing intervals 11 has the same width; and each of the second splicing intervals 12 has the same width.

In an exemplary embodiment of the present disclosure, the determining part 23 includes an analyzing component 23a and a determining component 23b.

The analyzing component 23a is configured to determine whether the physical position information of the touch point satisfies the following conditions:

$a \leq |x| - C*(a+m) \leq a+m;$   condition I:

$b \leq |y| - D*(b+n) \leq b+n;$   condition II:

$|x| - C*(a+m) < a$ and $b < |y| - C*(b+n);$   condition III:

where x is the position information of the touch point in the row direction; y is the position information of the touch point in the column direction; a is a size of the display units 10 in the row direction; b is a size of the display units 10 in the column direction; m is a width of the first splicing intervals 11; n is a width of the second splicing intervals 12; C=INT(|x|/(a+m)); D=INT(|y|/(b+n)); INT is rounded down.

The determining component 23b is configured to determine that the touch point is within the area of the splicing intervals when the physical position information of the touch point satisfies at least one of condition I and condition II; and determine that the touch point is beyond the area of the splicing intervals when the physical position information of the touch point satisfies condition III.

The calculating part 24 is configured to calculate, when the determining part 23 determines that the touch point is beyond the area of the splicing intervals, position information of a pixel unit in the touch splicing screen corresponding to the touch point according to a resolution of the touch splicing screen, the physical position information of the touch point in the touch splicing screen, a row number and a column number in an arrangement of the display units 10, the width of the first splicing intervals 11, the width of the second splicing intervals 12, and the sizes of each of the display units 10 in the row direction and in the column direction.

In an exemplary embodiment of the present disclosure, the touch splicing screen has a resolution of P*Q and the display units 10 in the touch splicing screen are arranged in a matrix of p columns and q rows. The position information of the pixel unit in the touch splicing screen corresponding to the touch point includes: a row number s and a column number r in the touch splicing screen of the pixel unit in the touch splicing screen corresponding to the touch point. The calculating part 24 is specifically configured to calculate the row number s and the column number r according to the following formulas:

$$r = \frac{P*(|x| - C*m)}{a*p + m*(p-1)}$$

$$s = \frac{Q*(|y| - D*n)}{b*q + n*(q-1)}$$

where x is an abscissa of the touch point in a preset coordinate system, and y is an ordinate of the touch point in the preset coordinate system; an origin of the preset coordinate system is a vertex of the touch splicing screen closest to the pixel unit of the first row and the first column, the x-direction is the row direction, and the y-direction is the column direction.

Further, the touch detection apparatus further includes a coordinate system establishing part 25 configured to establish a two-dimensional rectangular coordinate system, wherein an origin of the two-dimensional rectangular coordinate system is one of the vertices of the touch splicing screen; the x-direction is the row direction, and the y-direction is the column direction. In this case, the position information of the touch point in the row direction includes an abscissa of the touch point in the two-dimensional rectangular coordinate system, and the position information of the touch point in the column direction includes an ordinate of the touch point in the two-dimensional rectangular coordinate system.

In an exemplary embodiment of the present disclosure, the infrared ranging sensor 21a may be a two-way ranging sensor. For example, as shown in FIG. 1, when the infrared ranging sensor 21a is disposed between two adjacent display units 10 in the column direction, the infrared ranging sensor 21a simultaneously emits infrared rays leftward and rightward in the row direction to measure an interval width between the two adjacent display units 10 in the row direction, that is, the width m of the first splicing interval. Similarly, when the infrared ranging sensor 21a is disposed between two adjacent display units 10 in the row direction, the infrared ranging sensor 21a simultaneously emits infrared rays upward and downward in the column direction to measure an interval width between the two adjacent display units 10 in the column direction, that is, the width n of the second splicing interval. It should be understood that the two kinds of distance data measured by one infrared ranging sensor 21a in two directions (for example, the leftward and rightward directions or the upward and downward directions) may be transmitted to and processed by the calculating part 24 (e.g., summed or fine-tuned) to obtain the width m of the first splicing interval and the width n of the second splicing interval. An advantage of processing the two distance data by the calculating part 24 instead of by the infrared ranging sensor 21a is that when there is a measurement error or a deviation in the mounting positions of the infrared ranging sensors 21a, calibration adjustments for each of the infrared ranging sensors 21a are required, which involves great workload, but for the calculating part 24 of the entire apparatus, data correction may be simply done by setting the calculating part 24 by a user without calibration adjustments for each of the infrared ranging sensors 21a, which is simple, convenient, and efficient.

In an exemplary embodiment of the present disclosure, the sizes of each of the display units 10 in the row and column directions may be, in addition to being obtained by the first sensor 21, input manually by a user since they are usually known, which can reduce the measurement workload of the sensor. In the case where the user manually inputs the sizes of the display units 10 in the row and column directions, the touch detection apparatus may further include an input part for the user to input external data (for example, the sizes of the display units 10 in the row and column directions) or perform parameter settings, or the touch detection method may further include acquiring external data input by the user (e.g., the sizes of the display units 10 in the row and column directions) or the set parameters before the step S3. Similarly, the row number and the column number of the display units 10 may also be manually input by the user, which is not repeated herein.

In an exemplary embodiment of the present disclosure, the determining part 23, the analyzing component 23a, the determining component 23b, and the coordinate system establishing part 25 may be implemented by a DSP chip or an embedded chip. However, the determining part 23, the analyzing component 23a, the determining component 23b, and the coordinate system establishing part 25 of the present disclosure are not limited thereto, but may be any other device or circuit capable of performing calculation, analysis, and determination processing on data. For example, the determining part 23 and the determining component 23b may be a microprocessor or a determining circuit; the analyzing component 23a may be a microprocessor or an analyzing circuit; and the coordinate system establishing part 25 may be a microprocessor or a coordinate system establishing circuit. Additionally, in an exemplary embodiment of the present disclosure, the calculating part 24 may be a calculator or may be implemented by a DSP chip or an embedded chip. However, the calculating part 24 of the present disclosure is not limited thereto, but may be any other device or calculating circuit capable of performing arithmetic processing on data.

According to still another aspect of the present disclosure, there is provided a touch device including a touch splicing screen and a touch detection apparatus for the touch splicing screen, wherein the touch detection apparatus is the touch detection apparatus of any of the above exemplary embodiments.

According to still another aspect of the present disclosure, there is provided a computer device including a memory storing a computer program thereon and a processor, where the computer program is executed by the processor to implement the touch detection method of any of the above exemplary embodiments.

According to still another aspect of the present disclosure, there is provided a computer readable medium storing a computer program that, when executed by a processor, implements the touch detection method of any of the above exemplary embodiments.

The above described memory and computer readable medium include, but are not limited to, the following readable media: a random access memory (RAM), a read-only memory (ROM), a non-volatile random access memory (NVRAM), a programmable read-only memory (PROM), an erasable programmable read-only memory (EPROM), an electrically erasable programmable read only memory (EEPROM), a flash memory, a magnetic or optical data memory, a register, a magnetic disc or tape, an optical storage medium such as a compact disc (CD) or a DVD (digital versatile disc), and other non-transitory media. Examples of the processor include, but are not limited to, general purpose processors, central processing units (CPUs), microprocessors, digital signal processors (DSPs), controllers, microcontrollers, state machines, and the like.

The above is a description of the touch detection method, the touch detection apparatus, the touch device, the computer device and the computer readable medium for a touch splicing screen of the present disclosure. It can be seen that when a position of a pixel unit corresponding to a touch point is detected in the present disclosure, a physical position of the touch point is first detected, and then the position of the pixel unit corresponding to the touch point is determined from the physical position of the touch point, the sizes of the display units, the widths of the splicing intervals and the like, thereby avoiding an influence of the splicing intervals on the touch precision.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A touch detection method for a touch splicing screen comprising a plurality of display units arranged in an array, in which splicing intervals are present between any two adjacent display units, the splicing intervals comprising first splicing intervals between any two adjacent display units in a same row and second splicing intervals between any two adjacent display units in a same column, the touch detection method comprising:
   obtaining sizes of each of the display units in a row direction and in a column direction, a width of each of the first splicing intervals, and a width of each of the second splicing intervals;
   obtaining physical position information of a touch point in the touch splicing screen; and
   determining whether the touch point is within an area of the splicing intervals according to the physical position information of the touch point in the touch splicing screen, the sizes of each of the display units in the row direction and in the column direction, the width of each of the first splicing intervals, and the width of each of the second splicing intervals, when the touch point is beyond the area of the splicing intervals, calculating position information of a pixel unit in the touch splicing screen corresponding to the touch point according to a resolution of the touch splicing screen, the physical position information of the touch point in the touch splicing screen, a row number and a column number in an arrangement of the display units, the width of each of the first splicing intervals, the width of each of the second splicing intervals, and the sizes of each of the display units in the row direction and in the column direction; when the touch point is within the area of the splicing intervals, determining the touch operation to be an invalid operation.

2. The touch detection method according to claim 1, wherein each of the display units has a same size a in the row direction; each of the display units has a same size b in the column direction; each of the first splicing intervals has a same width m; each of the second splicing intervals has a same width n, and
   the step of determining whether the touch point is within the area of the splicing intervals according to the physical position information of the touch point in the touch splicing screen, the sizes of each of the display units in the row direction and in the column direction, the width of each of the first splicing intervals, and the width of each of the second splicing intervals comprises:
   determining whether the physical position information of the touch point satisfies the following conditions, and determining that the touch point is within the area of the splicing intervals when the physical position information of the touch point satisfies at least one of condition I and condition II; and determining that the touch point is beyond the area of the splicing intervals when the physical position information of the touch point satisfies condition III, $$a \le |x| - C^*(a+m) \le a+m; \qquad \text{condition I:}$$

$$b \le |y| - D^*(b+n) \le b+n; \qquad \text{condition II:}$$

$$|x| - C^*(a+m) < a \text{ and } b < |y| - C^*(b+n); \qquad \text{condition III:}$$

where x is the position information of the touch point in the row direction; y is the position information of the touch point in the column direction; $C=INT(|x|/(a+m))$; $D=INT(|y|/(b+n))$; INT is rounded down.

3. The touch detection method according to claim 2, wherein the touch splicing screen has a resolution of P*Q; the display units in the touch splicing screen are arranged in a matrix of p columns and q rows; the position information of the pixel unit in the touch splicing screen corresponding to the touch point comprises: a row number s and a column number r in the touch splicing screen of the pixel unit in the touch splicing screen corresponding to the touch point, which are calculated according to the following formulas:

$$r = \frac{P*(|x| - C*m)}{a*p + m*(p-1)}$$

$$s = \frac{Q*(|y| - D*n)}{b*q + n*(q-1)}$$

where x is an abscissa of the touch point in a preset coordinate system, and y is an ordinate of the touch point in the preset coordinate system, an origin of the preset coordinate system is a vertex of the touch splicing screen closest to the pixel unit of the first row and the first column, an x-direction is the row direction, and a y-direction is the column direction.

4. The touch detection method according to claim 2, wherein before the step of obtaining the physical position information of the touch point in the touch splicing screen, the touch detection method further comprises:
   establishing a two-dimensional rectangular coordinate system, wherein an origin of the two-dimensional rectangular coordinate system is a vertex of the touch splicing screen, an x-direction is the row direction, and a y-direction is the column direction;
   the position information of the touch point in the row direction comprises an abscissa of the touch point in the two-dimensional rectangular coordinate system, and the position information of the touch point in the column direction comprises an ordinate of the touch point in the two-dimensional rectangular coordinate system.

5. The touch detection method according to claim 1, wherein the physical position information of the touch point in the touch splicing screen is obtained by means of infrared detection.

6. The touch detection method according to claim 1, wherein the width of each of the first splicing intervals and the width of each of the second splicing intervals are both obtained by means of infrared detection.

7. A computer device, comprising a memory storing a computer program thereon and a processor, wherein the computer program is executed by the processor to implement the touch detection method according to claim 1.

8. A non-transitory computer readable medium storing a computer program thereon, wherein the computer program is executed by a processor to implement the touch detection method according to claim 1.

9. A touch detection apparatus for a touch splicing screen comprising a plurality of display units arranged in an array, in which splicing intervals are present between any two adjacent display units, the splicing intervals comprising first splicing intervals between any two adjacent display units in a same row and second splicing intervals between any two adjacent display units in a same column, the touch detection apparatus comprising:
- a first sensor configured to obtain sizes of each of the display units in a row direction and in a column direction, a width of each of the first splicing intervals, and a width of each of the second splicing intervals;
- a second sensor configured to obtain physical position information of a touch point in the touch splicing screen;
- a determining part configured to determine whether the touch point is within an area of the splicing intervals according to the physical position information of the touch point in the touch splicing screen, the sizes of each of the display units in the row direction and in the column direction, the width of each of the first splicing intervals, and the width of each of the second splicing intervals; and
- a calculating part configured to calculate, when the determining part determines that the touch point is beyond the area of the splicing intervals, position information of a pixel unit in the touch splicing screen corresponding to the touch point according to a resolution of the touch splicing screen, the physical position information of the touch point in the touch splicing screen, a row number and a column number in an arrangement of the display units, the width of each of the first splicing intervals, the width of each of the second splicing intervals, and the sizes of each of the display units in the row direction and in the column direction.

10. The touch detection apparatus according to claim 9, wherein each of the display units has a same size a in the row direction; each of the display units has a same size b in the column direction; each of the first splicing intervals has a same width m; each of the second splicing intervals has a same width n, and
- the determining part comprises an analyzing component and a determining component,
- the analyzing component is configured to determine whether the physical position information of the touch point satisfies the following conditions:

$a \leq |x| - C*(a+m) \leq a+m;$      condition I:

$b \leq |y| - D*(b+n) \leq b+n;$      condition II:

$|x| - C*(a+m) < a$ and $b < |y| - C*(b+n);$      condition III:

where x is the position information of the touch point in the row direction; y is the position information of the touch point in the column direction; C=INT(|x|/(a+m)); D=INT(|y|/(b+n)); INT is rounded down;
- the determining component is configured to determine that the touch point is within the area of the splicing intervals when the physical position information of the touch point satisfies at least one of condition I and condition II; and determine that the touch point is beyond the area of the splicing intervals when the physical position information of the touch point satisfies condition III.

11. The touch detection apparatus according to claim 10, wherein the touch splicing screen has a resolution of P*Q; the display units in the touch splicing screen are arranged in a matrix of p columns and q rows; the position information of the pixel unit in the touch splicing screen corresponding to the touch point comprises: a row number s and a column number r in the touch splicing screen of the pixel unit in the touch splicing screen corresponding to the touch point, the calculating part is configured to calculate the row numbers and the column number r according to the following formulas:

$$r = \frac{P*(|x| - C*m)}{a*p + m*(p-1)}$$

$$s = \frac{Q*(|y| - D*n)}{b*q + n*(q-1)}$$

where x is an abscissa of the touch point in a preset coordinate system, and y is an ordinate of the touch point in the preset coordinate system, an origin of the preset coordinate system is a vertex of the touch splicing screen closest to the pixel unit of the first row and the first column, the x-direction is the row direction, and the y-direction is the column direction.

12. The touch detection apparatus according to claim 10, wherein the touch detection apparatus further comprises:
- a coordinate system establishing part configured to establish a two-dimensional rectangular coordinate system, wherein an origin of the two-dimensional rectangular coordinate system is a vertex of the touch splicing screen, an x-direction is the row direction, a y-direction is the column direction;
- the position information of the touch point in the row direction comprises an abscissa of the touch point in the two-dimensional rectangular coordinate system, and the position information of the touch point in the column direction comprises an ordinate of the touch point in the two-dimensional rectangular coordinate system.

13. The touch detection apparatus according to claim 9, wherein the second sensor comprises an infrared detection wire frame that surrounds the touch splicing screen.

14. The touch detection apparatus according to claim 9, wherein the first sensor comprises an infrared ranging sensor disposed between each two adjacent display units.

15. A touch device, comprising: a touch splicing screen and a touch detection apparatus for the touch splicing screen, wherein the touch detection apparatus is the touch detection apparatus according to claim 9.

\* \* \* \* \*